VERTICAL TUBE FURNACE

Original Filed Oct. 9, 1967 2 Sheets-Sheet 1

VERTICAL TUBE FURNACE

Original Filed Oct. 9, 1967 2 Sheets-Sheet 1

United States Patent Office

Re. 28,018
Reissued May 21, 1974

28,018
VERTICAL TUBE FURNACE

Hans Torbjorn Lundstrom, Robertsfors, Sweden, by Allmanna Svenska Electriska Aktiebolaget, Vasteras, Sweden Original No. 3,470,303, dated Sept. 30, 1969, Ser. No. 673,623, Oct. 9, 1967. Application for reissue Apr. 2, 1973, Ser. No. 348,049
Claims priority, application Sweden, Oct. 12, 1966, 13,775/66
Int. Cl. H05b *3/62*
U.S. Cl. 13—20 7 Claims

Matter enclosed in heavy brackets [ ] appears in the original patent but forms no part of this reissue specification; matter printed in italics indicates the additions made by reissue.

ABSTRACT OF THE DISCLOSURE

A cylindrical oblong furnace arranged in a pressure chamber for isostatic compression with its longitudinal axis substantially vertical. To obtain uniform temperature in the furnace, a heat insulating sheath is provided which comprises at least one cell consisting of a space enclosed in a casing of material with low gas permeability. The said space communicates with its environment through at least one opening situated in an area which is rather short in the vertical direction in comparison with the height of the cell in the same direction.

BACKGROUND OF THE INVENTION

Field of the invention

The present invention relates to a cylindrical oblong furnace the longitudinal axis of which is substantially vertical. The furnace is preferably heated by means of electrical heating elements arranged in a furnace chamber enclosed in a heat-insulated sheath.

The prior art

As an example of the field of application for furnaces of this type may be mentioned equipment for isostatic compression. Such equipment is used, for example, in the manufacture of objects from powder, and especially long objects and objects with irregular shape. The powder mixture is enclosed in a capsule of rubber, plastic or other yielding material having the same shape as the desired product, after which the capsule is lowered into a pressure chamber and subjected to a uniform pressure of the order of 1000 bars. In order to obtain sintering of the powder at the same time, a furnace of the type mentioned is arranged inside the pressure chamber and gas, for example argon or helium, is used as the pressurising medium. The capsule is, in this case, usually made of metal sheet. To facilitate the handling of the substance when it is to be inserted in or withdrawn from the furnace, it is desirable that these operations can be carried out in the vertical direction. For this reason, such furnaces are usually arranged with their longitudinal axis vertical. However, this causes great difficulty in obtaining even temperature distribution along the furnace which, for example, may have a length of 1.5–2 m.

This is mainly because intensive natural convection arises in the furnace. The convection is caused by density variations in the radial direction which arise when the centre of the furnace is heated. The gas density is comparatively high but decreases as the temperature increases. This density decrease is particularly great at high pressure as here, for example, where the pressure of the gas (argon) is 2000 bars. The gas thus moves upwards in the warmer part of the furnace chamber and downwards near the cooler walls so that the temperature in the upper part of the furnace can thus become considerably higher than in the lower part. The convection in furnaces operating in gas under high pressure is particularly intensive since the great temperature dependency of the gas density is not compensated by a corresponding increase in viscosity. The viscosity under the pressures in question is, for example, for argon, only 4–5 times higher than that of air at atmospheric pressure, and about one-tenth of that of water.

In order to decrease the convection in the furnace and thus achieve a more even temperature distribution, it has been proposed to pivot the furnace so that when the substance is inserted in the furnace it can be swung into horizontal position. However, this is practical only with relatively small furnaces and the problem of uneven temperature distribution remains to a certain extent, even with this type of furnace. Another proposal is to use heating elements of different powers in the longitudinal direction of the furnace so that the heat development at the bottom of the furnace is greater than at the top. With only this precaution an uneven temperature distribution still exists in the furnace chamber, and a more or less constant temperature is obtained only in a part of the chamber. Also this measure requires unreasonably great power which is expensive and complicated and also increases the necessity of cooling the walls of the pressure chamber.

SUMMARY OF THE INVENTION

The purpose of the present invention is to produce in a furnace of the type described in the introduction, in a simple manner, a temperature distribution which in the longitudinal direction of the furnace is as even as possible. This is achieved, according to the invention, by arranging the heat insulation of the furnace sheath in the form of at least one cell consisting of a space enclosed in a casing of material with low gas permeability, the said space joining with the other spaces in the furnace through one or more openings situated in an area which is rather short in a vertical direction in comparison with the height of the cell in the same direction. The convection in a cell made in this way can be reduced in various ways to a very low value. For example, the cell may, for this purpose, be advantageously filled with insulating material which should fit close to the walls of the cell and have hardly any tendency to crack. It must also be able to withstand pressure alterations and for this reason should not have closed pores. The insulating material must also have low gas permeability in order to prevent convection. As examples of insulating material fulfilling these demands may be mentioned—packed insulating material in fibrous form on aluminum oxide-silicon dioxide, or carbon basis and certain insulating materials in fine granular form on aluminum oxide or magnesium oxide basis. If the insulation is formed of a greater number of cells whose length in radial direction of the furnace is relatively small, it is possible to achieve the desired effect even without any special filling in the cells.

By arranging openings in the cells, pressure equalisation is achieved in the furnace. The openings are suitably placed in the upper part of the cell if they are on a surface in contact with gas which is hotter than the average temperature in the cell, and in the lower part if it is in contact with gas which is cooler than the average temperature in the cell.

BRIEF DESCRIPTION OF THE DRAWINGS

The invention will now be described in greater detail, with reference to the example shown in the accompanying drawing.

DESCRIPTION OF THE PREFERRED EMBODIMENTS

Figure 1:
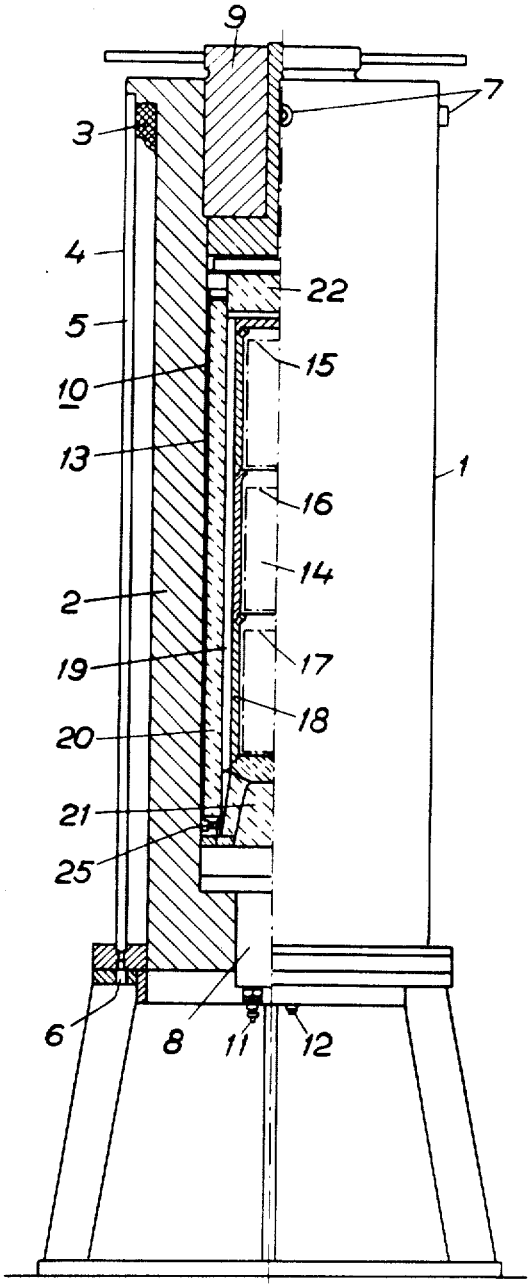
FIGURE 1 shows, in half section, a furnace according to the invention placed in a pressure chamber for isostatic compression.

The pressure chamber 1 in FIGURE 1 consists of a thick-walled cylindrical steel tube 2 around which has been wound, under prestress, a wire sheath 3 of cold-rolled, high-strength steel wire. By means of winding, such large radial and tangential compression forces have been achieved in the tube wall that the cylinder can withstand an internal pressure of over 3000 bars. Argon is used as the pressure gas. Between the wire sheath 3 and an outer iron sheath 4 is a ring-shaped gap 5 for cooling water which is led in through an inlet 6 in the bottom of the pressure chamber and out through an outlet 7 in the upper part of the chamber. The ends of the cylinder are sealed at the bottom with a plug 8 and at the top with a cap 9 which is screwed on. The bottom plug 8, which is connected with the furnace 10 placed in the pressure chamber 1, is provided with bushings 11 for electric current to the furnace, a bushing 12 for thermo-element conductors and a pipe-bushing, not shown, for the pressurized gas. The furnace 10 has a furnace chamber 14 surrounded by a sheath 13. Electric heating elements in the form of three loops 15, 16 and 17, are arranged in the furnace chamber and connected to the bushings 11. The heating elements are arranged on the inside of a number of fire-proof earthenware pipes 18 and are supported by these pipes. On the outside of the pipes is a ring-shaped gap 19 for conductors. Alternatively, the heating elements may, of course, be arranged on the outside of the pipes or between two concentrically arranged pipes. The furnace space 14 is provided with a heat insulation consisting of a surrounding ring-shaped insulating cell 20, a bottom part 21 and a lid 22. The cell 20 consists of a casing of metal sheet which is filled with packed insulating material in fibrous form having reasonable gas permeability. For pressure equalisation, a narrow ring-shaped gap 23 (FIGURE 2) is arranged in the upper part of the cell, this being the only opening in the cell casing. The bottom part 21 and the lid 22 are made of encapsuled insulating material in corresponding manner. Thus, in FIGURE 2 the pressure equalisation opening 24 of the lid is shown. The only opening between the furnace chamber 14 and the space outside the furnace sheath consists of the opening 25 in the lower part of the furnace. The furnace shown in FIGURE 1 is intended to operate at a pressure of 2000 bars with a furnace temperature of 1350° C. During test operations with such a furnace the temperature variation within 90% of the length of the furnace has provided to be practically negligible.

Figure 2:
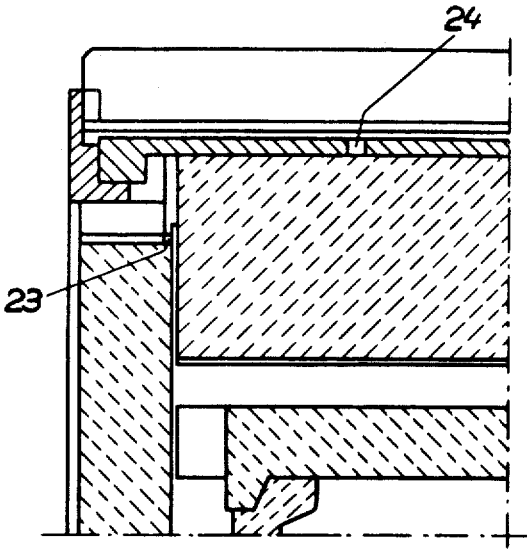
FIGURE 2 shows on a larger scale, a detail of the upper part of the furnace.
Figure 3:
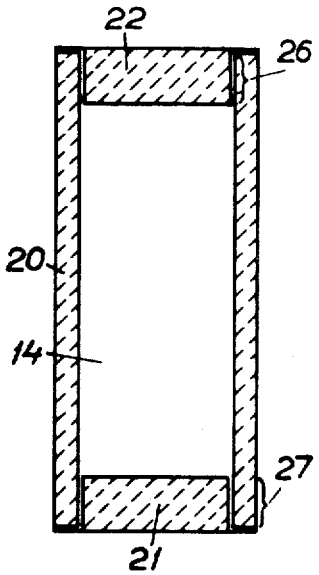
FIGURE 3 shows a furnace insulating comprising a single ring-shaped cell.

FIGURE 3 shows in principle where the openings are suitably placed in a sheath insulation consisting of a single ring-shaped cell such as in the example according to FIGURES 1 and 2. If there is a separate pressure equalisation opening between the spaces inside and outside the insulation sheath, the openings are placed either in the area 26 with connections to the furnace chamber 14 at its upper part, or in the area 27 with connections to the space outside the insulation sheath. If, however, such pressure equalisation openings are omitted, openings may be placed in both areas.

Figure 4:
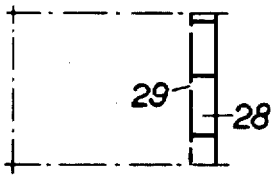
FIGURES 4–7 show alternative embodiments of sheath insulations having several cells.

FIGURE 4 shows a section through an insulation sheath consisting of several cells 28 with pressure equalisation openings 29.

Figure 5:
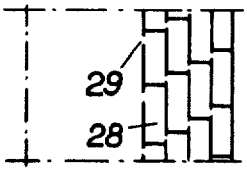
Figure 6:
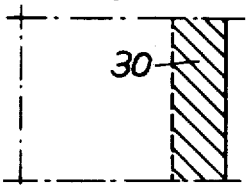
Figure 7:
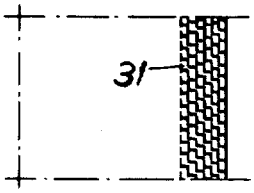

In the embodiment shown in FIGURE 5, the insulation is built up of several radially arranged layers of the type shown in FIGURE 4. An alternative arrangement with several conical insulating cells 30 arranged one above the other in the longitudinal direction of the furnace is shown in FIGURE 6. All the insulating cells shown in FIGURES 1–6 should suitably be filled with a heat-resistant insulating material of the above described type. However, if the cells are relatively narrow in the radial direction, for example as the cells 31 in FIGURE 7, and the insulation is built up of a great number of these cells, they do not need to be provided with any special filling. The walls between different cells and also the surrounding capsule are suitably made of metal sheeting which may be relatively thin and possibly made of an alloy having low heat-conducting capacity. The cell or cells constitute a heat-insulating sheath.

I claim:

1. A plant for hot isostatic compaction comprising a pressure chamber (2), said pressure chamber having a wall capable of confining an inert gas under pressure, a cylindrical elongated furnace chamber (14) within said pressure chamber with the longitudinal axis of the furnace chamber substantially vertical, heating means arranged in said furnace chamber, a heat-insulating sheath enclosing said furnace chamber, said heat-insulating sheath comprising at least one cell constituting an insulation space enclosed in a casing of material substantially impermeable to gas, said insulation space communicating with said furnace chamber and the space outside the heat-insulating sheath only through opening means for pressure equalization, each said opening means being situated in an area which is short in vertical direction in comparison with the height of the cell in the same direction.

2. A plant according to claim 1, in which said cell casing is made of sheet metal.

3. A plant according to claim 1, in which said cell is filled with packed insulating material in fibrous form.

[4. A plant according to claim 1 in which said opening means between said insulation space and the space outside the heat-insulating sheath are arranged in the upper part of the cell casing.]

[5. A plant according to claim 1, in which said opening means between said insulation space and said pressure chamber are arranged in the lower part of the cell casing.]

6. A plant according to claim 1 in which said heat-insulating sheath comprises a plurality of cells.

7. A plant according to claim 1, in which said cells are filled with packed insulating material in fibrous form.

*8. A plant according to claim 1, in which said opening means between said insulation space and said furnace chamber are arranged in the upper part of the cell casing.*

*9. A plant according to claim 1, in which said opening means between said insulation space and said space outside the heat-insulating sheath are arranged in the lower part of the cell casing.*

References Cited

The following references, cited by the Examiner, are of record in the patented file of this patent or the original patent.

UNITED STATES PATENTS

| | | | |
|---|---|---|---|
| 1,218,582 | 3/1917 | Pfanstiehl | 13—20 |
| 2,744,152 | 5/1956 | White | 13—20 |
| 3,213,177 | 10/1965 | Diefendorf | 13—20 |

ROY N. ENVALL, Jr., Primary Examiner

U.S. Cl. X.R.

13—31